United States Patent Office.

JOHN E. NOYES, OF NEW ALBANY, INDIANA.

Letters Patent No. 82,151, dated September 15, 1868.

IMPROVED ILLUMINATING-OIL.

The Schedule referred to in these Letters Patent and making part of the same.

TO ALL WHOM IT MAY CONCERN:

Be it known that I, JOHN E. NOYES, of New Albany, in the county of Floyd, and in the State of Indiana, have invented certain new and useful Improvements in Burning-Fluids; and do hereby declare that the following is a full, clear, and exact description thereof.

My burning-fluid is manufactured substantially as follows:

To two hundred and forty gallons of coal-oil add, oil of rhodium, one pint; oil of origanum, one pint; salts of tartar, one pound; Rock Island salt, five pounds; common clay, ten pounds.

After these ingredients have been thoroughly compounded, dissolved, and mixed with the coal-oil, or benzine, or naphtha, I filter them through wool and cotton mixed, or through raw cotton and wool, placed in layers, which has first been saturated or impregnated with rock-salt. In order to properly or fully impregnate the cotton or wool with salt, it may be necessary to first saturate the same with alcohol, and then place it in connection with the salt. The clay is placed on the wool or cotton, and acts as a filter and purifier for the other ingredients.

I may add a small quantity of creosote to the oil, as a disinfectant and purifier.

I use the Rock Island salt because it is stronger, and purifies the oil, and prevents it from becoming rancid.

This solution, filtered in this manner, makes a very light, volatile, and non-explosive oil, which will not discolor any material upon which it may fall. It has very little odor, and it may be used in any of the ordinary lamps now in use, and with perfect safety.

Having thus fully described my invention, what I claim as new, and desire to secure by Letters Patent, is—

The within-described burning-fluid, compounded and prepared substantially as set forth.

In testimony that I claim the foregoing, I have hereunto set my hand, this 26th day of February, 1868.

J. E. NOYES.

Witnesses:
C. M. ALEXANDER,
V. D. STOCKBRIDGE.